United States Patent [19]

Miano et al.

[11] 4,197,373

[45] Apr. 8, 1980

[54] MELAMINE DERIVATIVES AS FLAME RETARDANTS FOR POLYURETHANES

[75] Inventors: Jeffrey D. Miano, Norristown; Stanley R. Sandler, Springfield, both of Pa.

[73] Assignee: Pennwalt Corporation, Philadelphia, Pa.

[21] Appl. No.: 972,602

[22] Filed: Dec. 22, 1978

[51] Int. Cl.$^2$ ............................................. C08G 18/14
[52] U.S. Cl. .................................... 521/128; 521/118; 521/166
[58] Field of Search ......................... 521/118, 128, 166

[56] References Cited

U.S. PATENT DOCUMENTS

| 3,399,151 | 8/1968 | Kaiser | 521/166 |
| 3,462,381 | 8/1969 | Eaton et al. | 521/166 |
| 3,824,239 | 7/1974 | Narayan et al. | 521/166 |
| 4,139,501 | 2/1979 | Rudner et al. | 521/166 |

Primary Examiner—Maurice J. Welsh

[57] ABSTRACT

Flame retarded polyurethane foams are prepared from a reaction mixture comprising as the flame retardant additive the compound N,N'-bis(1-hydroxy-2,2,2-trichloroethyl)melamine or its derivatives.

7 Claims, No Drawings

MELAMINE DERIVATIVES AS FLAME RETARDANTS FOR POLYURETHANES

BACKGROUND OF THE INVENTION

This invention relates to a flame retarded polyurethane foam, and more particularly, a polyurethane foam prepared by adding to the reaction mixture a derivative compound of melamine containing the 2,2,2-trichloroethyl group.

Prior to the instant invention, polyurethane foam was made flame retarded normally by incorporating phosphorus and/or halogen containing compounds into the polyurethane formulation. One such flame retardant for polyurethane foam is 2,3-dibromo-2-butene-1, 4-diol which is described in U.S. Pat. Nos. 3,919,166 and 4,022,718. The disadvantages of this material are its relatively high cost and its poor processibility at high loadings. U.S. application Ser. No. 890,358 discloses N,N'-di(1-hydroxy-2,2,2-trichloroethyl) urea as a flame retardant additive for polyurethane foam. Although this compound is an effective flame retardant, it is soluble in the polyols used for preparing the polyurethane foam and thus decrease the load bearing properties of the foam.

The compounds of the present invention overcome the disadvantages of the prior art because they are insoluble in the polyol and thus increase the load bearing properties of flexible polyurethane foams as measured by the Indentation Load Deflection test described in ASTM D 2406-73. (The Indentation Load Deflection test is a measure of the force necessary to indent a foam sample to a specified thickness). The compounds of this invention also do not adversely affect the support (sag) factor of the foam as do prior art compounds. The support (sag) factor is measured as the ratio of the 65% Indentation Load Deflection value to the 25% Indentation Load Deflection value and is related to foam comfort.

STATEMENT OF THE INVENTION

The present invention is directed to a flame retarded polyurethane foam prepared from a reaction mixture which comprises a flame retarding amount of a compound having the formula

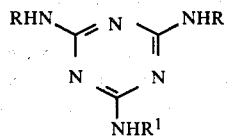

10 wherein:
(a) R is selected from

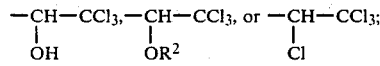

(b) $R^1$ is selected from H or R;
(c) $R^2$ is selected from an alkyl of 1 to 5 carbons, or

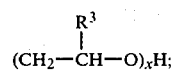

(d) $R^3$ is selected from H, $CH_3$, $CCl_3$, $CH_2CCl_3$; and
(e) x is an integer from 1-10.

DETAILED DESCRIPTION OF THE INVENTION

The present invention is directed to a flame retarded polyurethane foam. The most common types of polyurethanes are formed by the reaction of toluene diisocyanate (TDI) or polymethylene polyphenylisocyanate or mixtures thereof, with polyfunctional hydroxy compounds. The flame retardant additives described in this invention are effective as flame retardants for hot-cure flexible polyurethane foam, high-resiliency (HR) polyurethane foam, rigid polyurethane foam, and rigid polyurethane/isocyanurate foam copolymers.

The flame retardant additives used to prepare the polyurethane foams of this invention may be prepared by the reaction of melamine with chloral or chloral hydrate following the method of Bump and Atkinson, *Journal of the American Chem. Soc., Volume* 72, page 629, (1950). The melamine is stirred with chloral or chloral hydrate in a solvent at 25° to 150° C., preferably 70° to 90° C., to afford the desired composition. Solvents that may be used in these reactions include water, ether, benzene, toluene and tetrahydrofuran. Catalysts that may be used to increase the rate of reaction between chloral and the nitrogen-containing compound include hydrochloric acid, sulfuric acid, acetic acid or boron trifuoride etherate.

These compounds are added to the reactants for preparing the polyurethane foams in the amount of 0.25 to 30 parts per 100 parts of the polyol (php) component by weight to impart flame retardancy. The preferred loading in high-resiliency polyurethane foam is 0.5 to 2.0 php by weight.

Representative flame retardant additives used in this invention are:

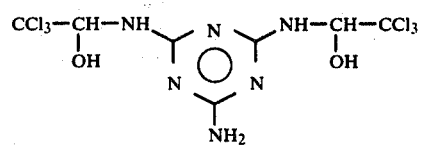

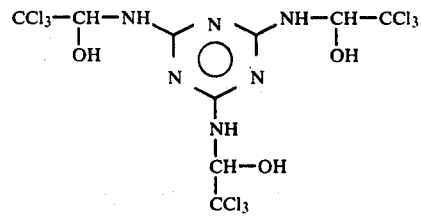

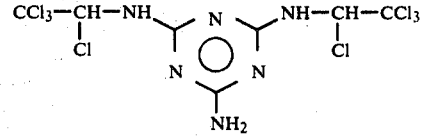

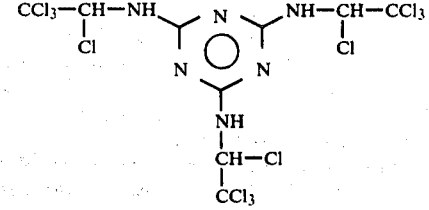

-continued

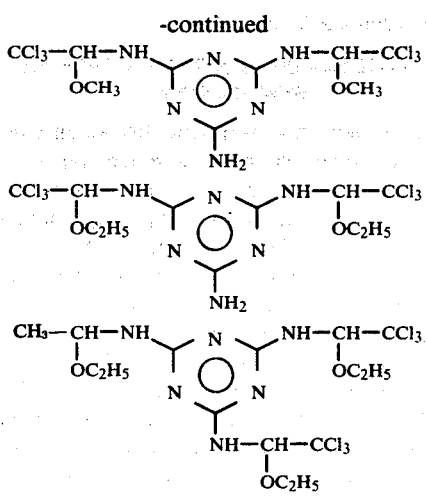

The preferred additives for use as flame retardants in polyurethane foam are:

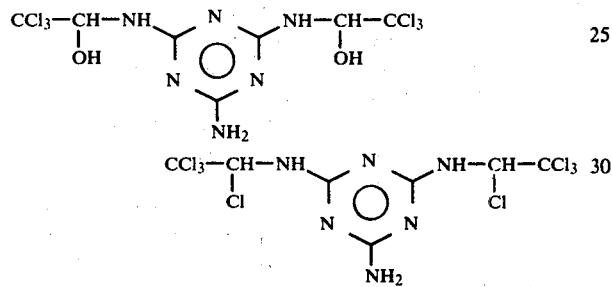

The flame retardant additives used in this invention may also be further reacted with various unsubstituted or halogen substituted epoxides to increase the molecular weight of the flame retardant and/or increase the halogen content. Epoxides useful for these purposes include ethylene oxide, propylene oxide, 3,3,3-trichloro-1, 2-propylene oxide, and 4,4,4-trichloro-1, 2-butylene oxide. Representative products of this reaction are:

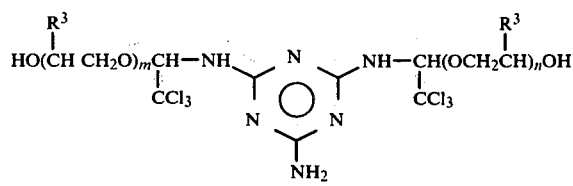

where $R^3$=H, $CH_3$, $CCl_3$, or $CH_2$—$CCl_3$
where m and n are integers with values of 1-10.

The following examples illustrate the present invention but are not intended to limit the invention thereto.

Polyurethane foams described in the following examples are made by dissolving the flame retardant additive in the polyol followed by addition of catalysts, surfactant, water and/or blowing agent and isocyanate as described by K. C. Frisch and S. L. Reegan in "Advances in Urethane Science and Technology", Vol. 1-4, Technomic Publishing Co. Conn., 1971-1976. In the case of flexible foams, this mixture is stirred by a high-speed mixer and is poured into a 13×13×5-inch mold which may or may not be clamped shut. After the reaction is completed, the foam is removed and aged at room temperature for at least seven days (conventional hot-cure foams are cured at 110° C. for ½ hour prior to aging). Rigid foams are made by pouring the stirred reaction mixture into an 8×8×5-inch box and allowing the reaction to proceed under "free rise" conditions. The physical properties of the flexible foams are then evaluated using ASTM D-2406-73; the flame retardant properties of both flexible and rigid foams are evaluated using ASTM D-1692-74 and/or ASTM D-2863-74 or MVSS-302.

EXAMPLE 1

Preparation of N,N'-bis(1-hydroxy-2,2,2-trichloroethyl) melamine

This compound has previously been prepared by Bump and Atkinson [*J. Am Chem. Soc.*, 72, 629 (1950)]. Melamine (44.2 g, 0.3 mole) was added all at once to a stirred solution of chloral (221.2 g, 1.5 mole) dissolved in 375 ml. of water at 70°-80° C. The reaction mixture was stirred for 3 hours and the white precipitated product was filtered to give an 81% yield after drying. The product had a melting point >200° C. and decomposed on further heating.

The infrared spectrum and elemental analysis of the compound were consistent with the assigned structure:

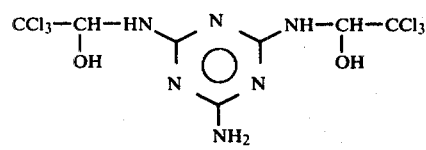

Anal. Calcd.: C, 20.0; H, 1.90; N, 20.0; Cl, 50.6
Found: C, 20.0; H, 2.04; N, 19.8; Cl, 49.1

EXAMPLE 2

Preparation of N,N'-bis(1,2,2,2-tetrachloroethyl) melamine

This compound has previously been prepared by Dolatyan and Kostanyan [*Arm. Khim. Zh.*, 20, 123 (1967)]. A mixture of phosphorus pentachloride (43.8 g, 0.1 mole) and the composition of Example 1 (42.1 g, 0.1 mole) were stirred in 100 ml. ether at room temperature overnight. The reaction mixture was filtered and the filtrate was evaporated to give the crude product. The product was washed with hexane, filtered and dried to afford 25 g (56%) of material having a m.p. of 245° C. (Lit. 250°-2° C.).

The infrared spectrum of the compound was consistent with the assigned structure:

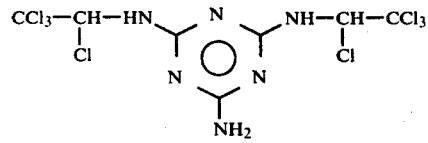

EXAMPLES 3—5

The compound synthesized in Example 1 was incorporated into the following high-resiliency polyurethane formulation:

|  | Parts |
|---|---|
| Pluracol 538 (BASF Wyandotte)[1] | 60 |
| Pluracol 581 (BASF Wyandotte)[2] | 40 |
| $H_2O$ | 2.7 |
| Dabco 33LV (Air Products)[3] | 0.3 |
| Niax A-1 (Union Carbide)[4] | 0.12 |
| Niax A-4 (Union Carbide)[5] | 0.3 |
| T-12 (M&T)[6] | 0.03 |
| DCF-1630 (Dow Corning)[7] | 0.04 |
| Niax SF-58 (Union Carbide)[8] | 34.9 |
| Additive | see Table 1 |

[1] Polyether polyol containing primary OH groups, OH number = 35
[2] Polymer polyol
[3] 33% Triethylene diamine, 67% Dipropylene glycol
[4] 70% Bis(dimethylaminoethyl)ether, 30% Diluent
[5] 33% Dimethylamino dimethylpropionamide, 67% Diluent
[6] Dibutyltin dilaurate
[7] Silicone surfactant
[8] 80% (80/20 mixture of 2,4/2,6 toluene diisocyanate), 20% polymeric isocyanate Table 1

| Ex. # | php | Additive | ILD Values[1] 25% | (lb/50 in)[2] 65% | Support (Sag) Factor[2] | MVSS-302 Flamm. Test |
|---|---|---|---|---|---|---|
| 3 | — | None | 39 | 99 | 2.5 | Burns-rate less than 2 in/min |
| 4 | 3 | Example 1 Compound | 45 | 113 | 2.5 | Self extinguishing - does not continue to burn |
| 5 | 3 | Fyrol CEF [Tris (2-chloroethyl) phosphate] | 42 | 95 | 2.3 | Self extinguishing - does not continue to burn |

[1] Indent Load Deflection Test - ASTM D 2406-73
[2] Ratio of 65% ILD to 25% ILD The results of the 25% and 65% Indent Load Deflection tests (ASTM D-2406-73) on the compound of Example 1 (Example 4) are higher than the control foam without flame retardant (Example 3) and the foam with tris (2-chloroethyl) phosphate (Example 5). In addition, the support factor (65% ILD/25% ILD) for the foam containing the compound of Example 1 (Example 4) is comparable to the control (Example 3) whereas it is larger than the foam containing tris (2-chloroethyl) phosphate (Example 5).

EXAMPLES 6-7

| Formulation (flexible polyurethane foam) | Parts |
|---|---|
| Polyol Poly G 30-56 (Olin)[1] | 100.0 |
| Water | 3.5 |
| Surfactant L5710 (Union Carbide)[2] | 1.0 |
| Catalyst T-9 (M & T)[3] | 0.2 |
| Catalyst Dalco 33 LV (Air Products)[4] | 0.3 |
| Isocyanate - TDI (Olin)[5] | 45.0 |
| Additive | See Table 2 |

Table 2

| Ex. # | Additive | php | Flame Data ASTM D-1692 (inches burned) | LOI |
|---|---|---|---|---|
| 6 | none | — | Total | 17.4 |
| 7 | Compound of Example #1 | 9 | 2.7 | 19.5 |

[1] Polyether polyol, molecular weight >3,000, OH number = 56
[2] Silicon surfactant
[3] Stannous octoate
[4] 33% Triethylenediamine, diamine, 67% Dipropylene glycol
[5] 80/20 mixture of 2,4/2,1 toluene diisocyanate

EXAMPLES 8-9

| Formulation (rigid polyurethane foam) | Parts |
|---|---|
| Polyol Poly G71-530 (Olin)[1] | 100.0 |
| Surfactant DC-193 (Dow)[2] | 1.5 |
| Dimethylaminoethanol | 2.94 |
| Dibutyltin dilaurate | 0.06 |
| Blowing Agent Isotron 11 (Pennwalt)[3] | 30.0 |
| Isocyanate - PAPI (Upjohn)[4] | See Table 3 |
| Additive | See Table 3 |

Table 3

| Ex. # | Additive | php | Flame Data ASTM D 1692 (inches burned) | LOI |
|---|---|---|---|---|
| 8 | Compound of Example 1 | 25 | 1.6 | 21.6 |
|  | PAPI | 173 |  |  |
| 9 | none | — |  |  |
|  | PAPI | 145 | 5.0 | 20.8 |

[1] Polyether polyol, OH number = 530, functionality = 4.5
[2] Silicone surfactant
[3] Fluorocarbon 11 ($CCl_3F$)
[4] Polymeric isocyanate, NCO equivalent = 133

EXAMPLE 10

To the rigid-foam formulation of Examples 8-9 was added 30 pph of the composition of Example 2. The foam was self extinguishing and gave flammability results equivalent to that of Example 8.

EXAMPLE 11

One mole of the composition of Example 1 was reacted with 2.2 moles of propylene oxide at 50°-100° C. in the presence of 1.0 g of $BF_3$ etherate catalyst to give a compound consistent with the assigned structure:

$$CCl_3-CH-N\underset{HOCHCH_2O}{\overset{H}{|}}\underset{\underset{NH_2}{|}}{\underset{N}{\bigcirc}}N-NH-CH-CCl_3\;\;OCH_2CHOH\;\;CH_3$$

EXAMPLE 12

To the rigid foam formulation of Examples 8-9 was added 30 pph of the composition of Example 11. The foam was self extinguishing and gave flammability results equivalent to that of Example 8.

What is claimed:

1. A polyurethane foam prepared from a reaction mixture which comprises a flame retarding amount of a compound having the formula

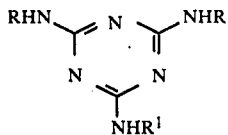

wherein:
(a) R is selected from

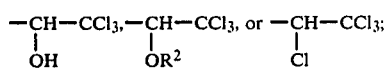

(b) $R^1$ is selected from H or R;
(c) $R^2$ is selected from an alkyl of 1 to 5 carbons, or

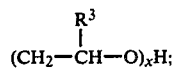

(d) $R^3$ is selected from H, $CH_3$, $CCl_3$, $CH_2CCl_3$; and
(e) x is an integer from 1-10.

2. The polyurethane foam of claim 1 wherein the compound is

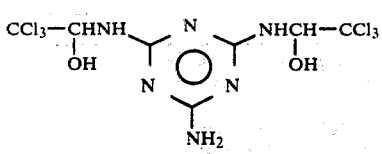

3. The polyurethane foam of claim 1 wherein the compound is

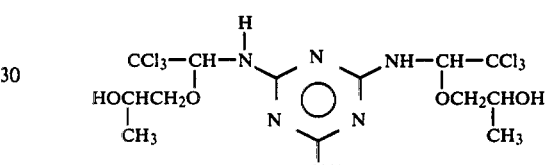

4. The polyurethane foam of claim 1 wherein the polyurethane foam is rigid foam.
5. The polyurethane foam of claim 1 wherein the polyurethane foam is high-resiliency foam.
6. The polyurethane foam of claim 1 wherein the polyurethane foam is flexible foam.
7. The polyurethane foam of claim 1 wherein the compound is

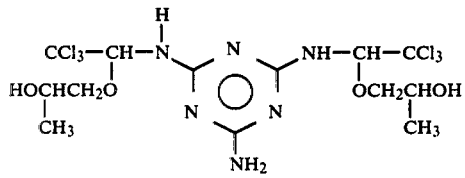

* * * * *